US008856365B2

(12) United States Patent
Zurmuehl et al.

(10) Patent No.: US 8,856,365 B2
(45) Date of Patent: Oct. 7, 2014

(54) COMPUTER-IMPLEMENTED METHOD, COMPUTER SYSTEM AND COMPUTER READABLE MEDIUM

(75) Inventors: Martin Zurmuehl, Muehlhausen (DE); Ralf Handl, Heidelberg (DE)

(73) Assignee: SAP AG, Walldorf (DE)

( * ) Notice: Subject to any disclaimer, the term of this patent is extended or adjusted under 35 U.S.C. 154(b) by 51 days.

(21) Appl. No.: 13/406,991

(22) Filed: Feb. 28, 2012

(65) Prior Publication Data
US 2013/0227153 A1 Aug. 29, 2013

(51) Int. Cl.
*G06F 15/16* (2006.01)
(52) U.S. Cl.
USPC ............................. 709/228; 709/203; 709/217
(58) Field of Classification Search
CPC ............................. H04L 29/0809; G06F 9/54
USPC ........................... 709/228, 203, 201, 217, 219
See application file for complete search history.

(56) References Cited

U.S. PATENT DOCUMENTS

| | | | |
|---|---|---|---|
| 6,934,697 B1 * | 8/2005 | Warren | 1/1 |
| 7,340,679 B2 | 3/2008 | Botscheck et al. | |
| 7,757,208 B2 | 7/2010 | Degenkolb et al. | |
| 7,784,022 B2 | 8/2010 | Elfner et al. | |
| 7,962,470 B2 | 6/2011 | Degenkolb et al. | |
| 2003/0204428 A1 | 10/2003 | Botscheck et al. | |
| 2003/0204429 A1 | 10/2003 | Botscheck et al. | |
| 2003/0204432 A1 | 10/2003 | Botscheck et al. | |
| 2003/0204433 A1 | 10/2003 | Botscheck et al. | |
| 2006/0053040 A1 | 3/2006 | Zurmuehl | |
| 2006/0053381 A1 | 3/2006 | Degenkolb et al. | |
| 2007/0250304 A1 | 10/2007 | Elfner et al. | |
| 2007/0282879 A1 | 12/2007 | Degenkolb et al. | |
| 2007/0288374 A1 | 12/2007 | Borchardt et al. | |
| 2009/0327106 A1 | 12/2009 | Bartelt et al. | |
| 2010/0333003 A1 | 12/2010 | Zurmuehl et al. | |

FOREIGN PATENT DOCUMENTS

| | | | |
|---|---|---|---|
| EP | 1 244 261 A2 | 9/2002 | |
| EP | 1 819 125 A1 | 8/2007 | |
| WO | WO 03/056732 A1 | 7/2003 | |
| WO | WO 2012/019653 | 2/2012 | |
| WO | WO 2012019653 * | 2/2012 | .............. H04L 29/08 |
| WO | WO 03/067427 A2 | 8/2013 | |

OTHER PUBLICATIONS

EP Communication and European Search Report; dated Aug. 6, 2012 re EP Appl No. 12001357.8-1243; (6 pages).
EP Communication dated Mar. 19, 2014 re EP Application No. 12001357.8-1957; (6 pages).

* cited by examiner

*Primary Examiner* — Frantz Jean
(74) *Attorney, Agent, or Firm* — Fish & Richardson P.C.

(57) ABSTRACT

The present application relates to a computer implemented method for processing a request to connect to a server from an application residing on a client device. The method may comprise, among other operations, receiving the request to connect to the server from the application residing on the client device. In response, the method determines a matched service interface and an access indicator of the matched service interface. The access indicator of the matched service interface is sent to the application residing on the client device in response to the request to connect to the server. If more than one matched service interface is determined, a best matching service interface may be determined. In some instances, the best matching service interface is the newest version of the matched service interface.

10 Claims, 8 Drawing Sheets

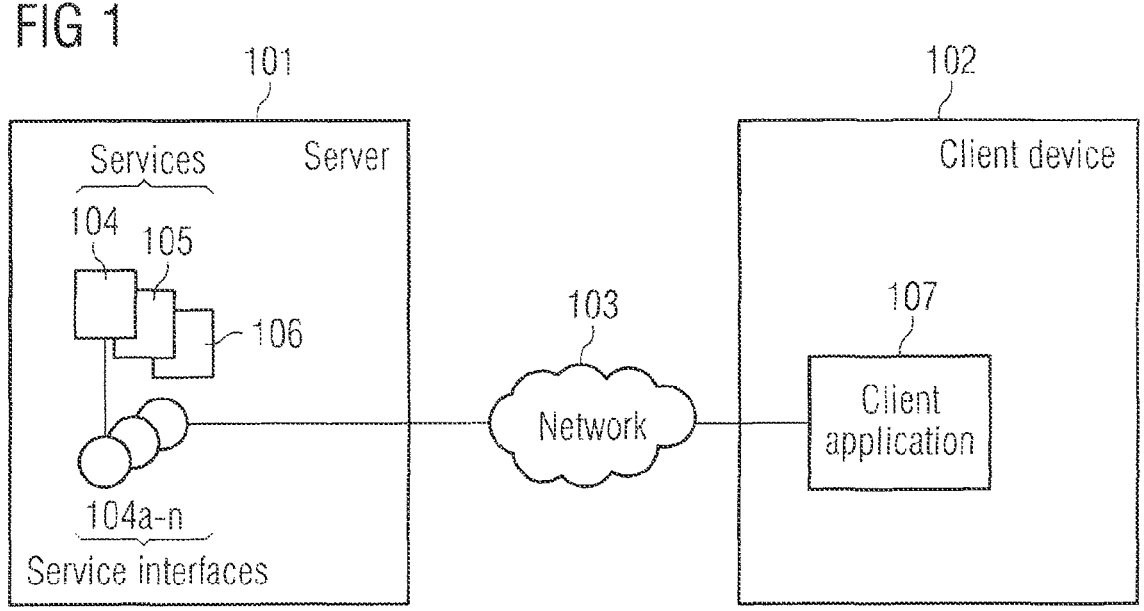

FIG 2A
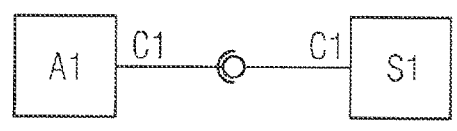
○——— offers contract
———⊂ is able to use contract
FIG 2B
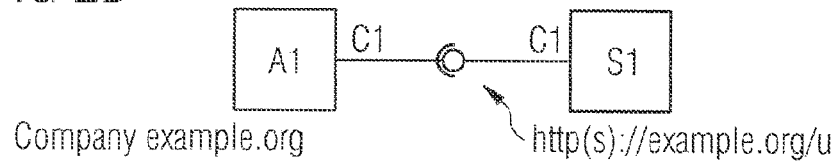
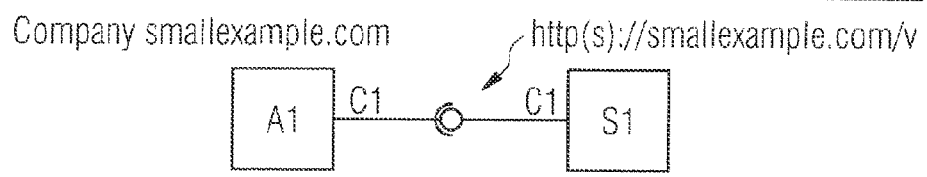

FIG 2C
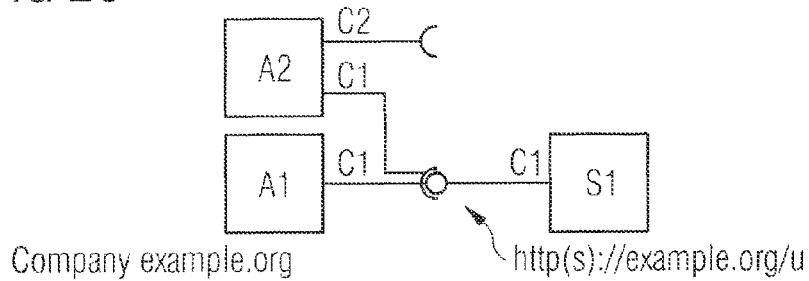
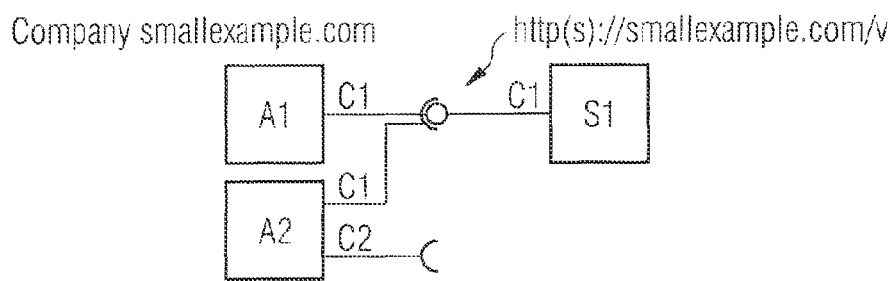
FIG 2D
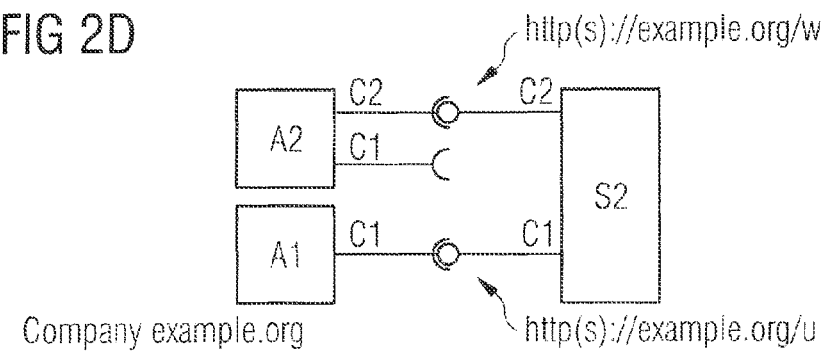
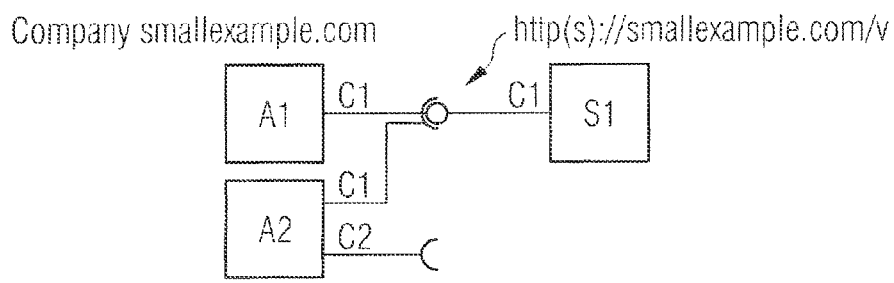

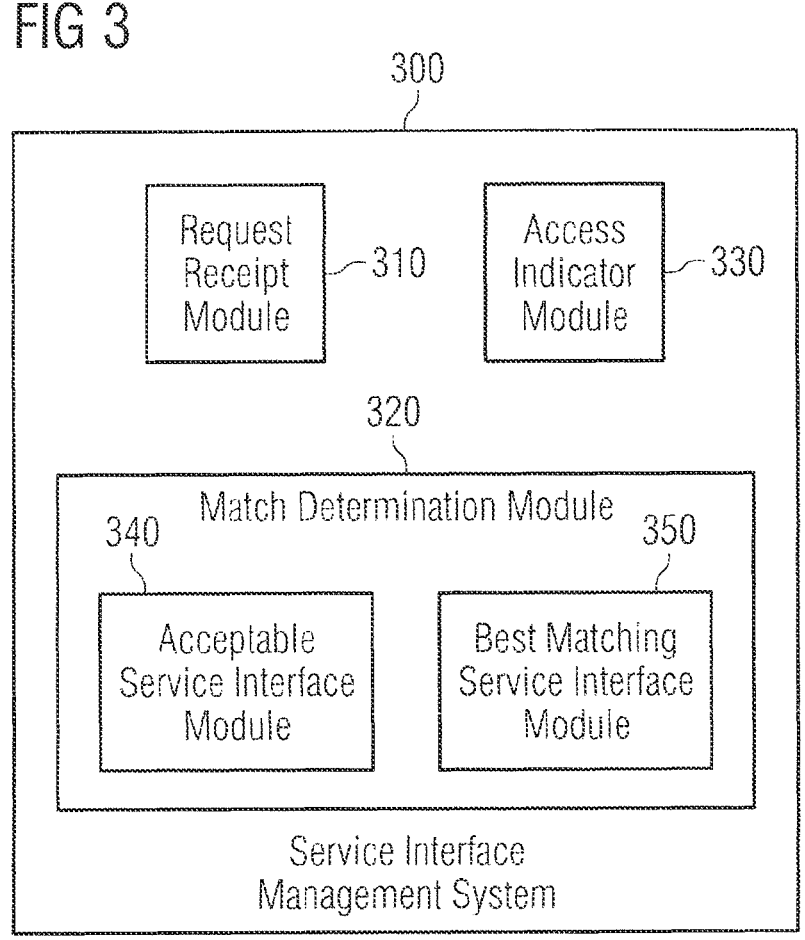

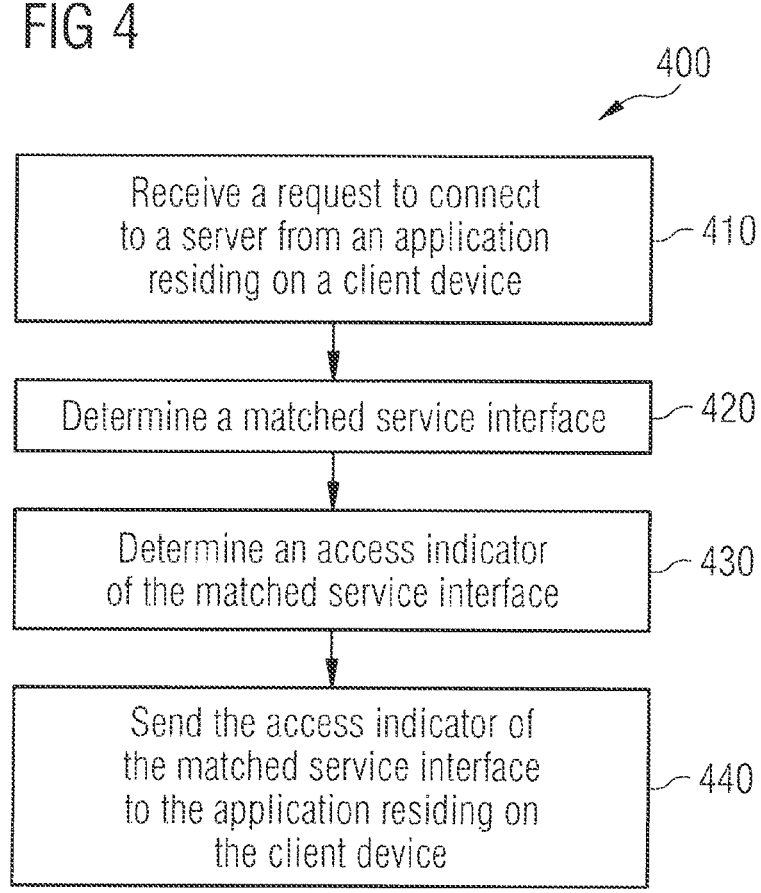

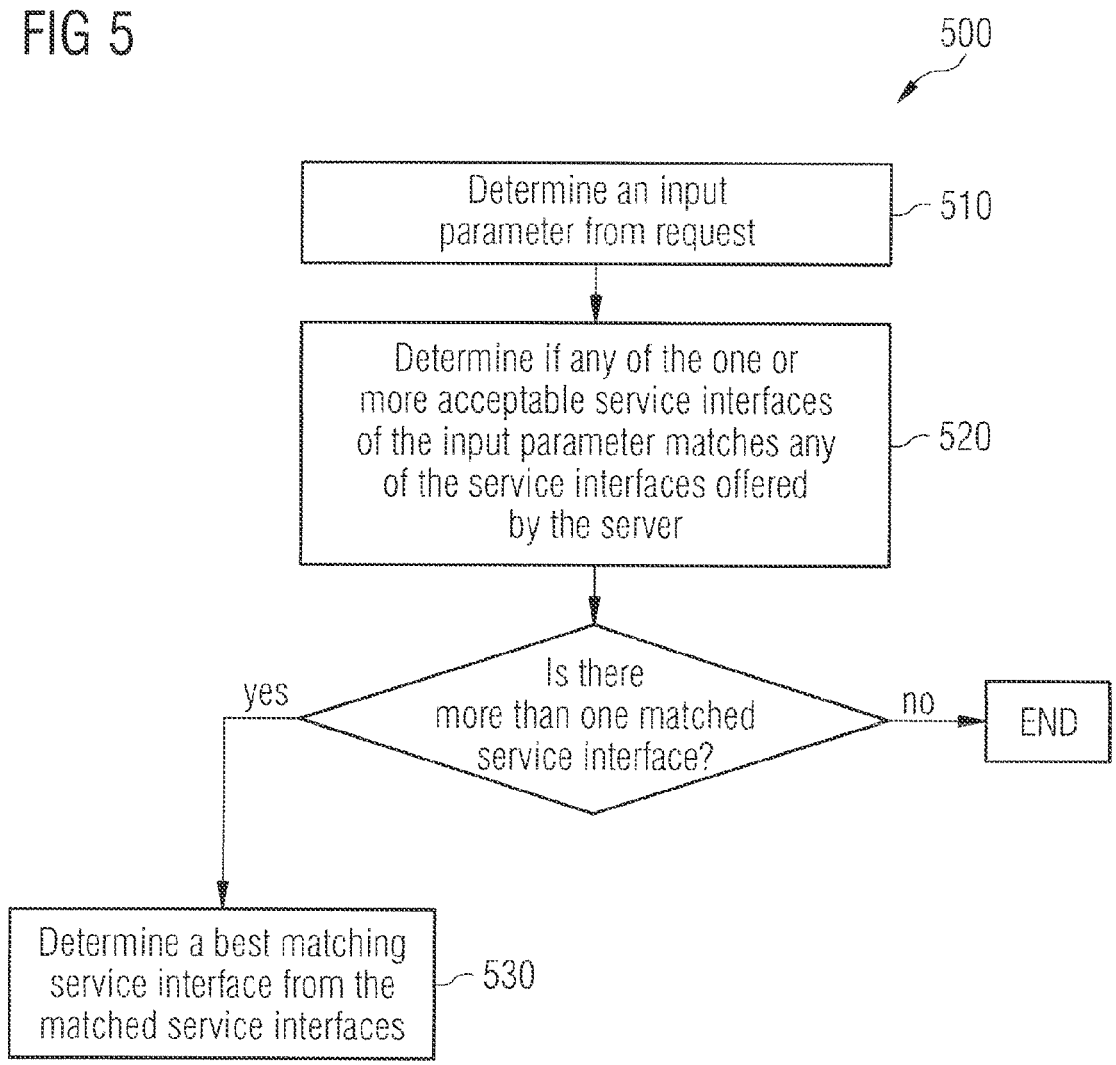

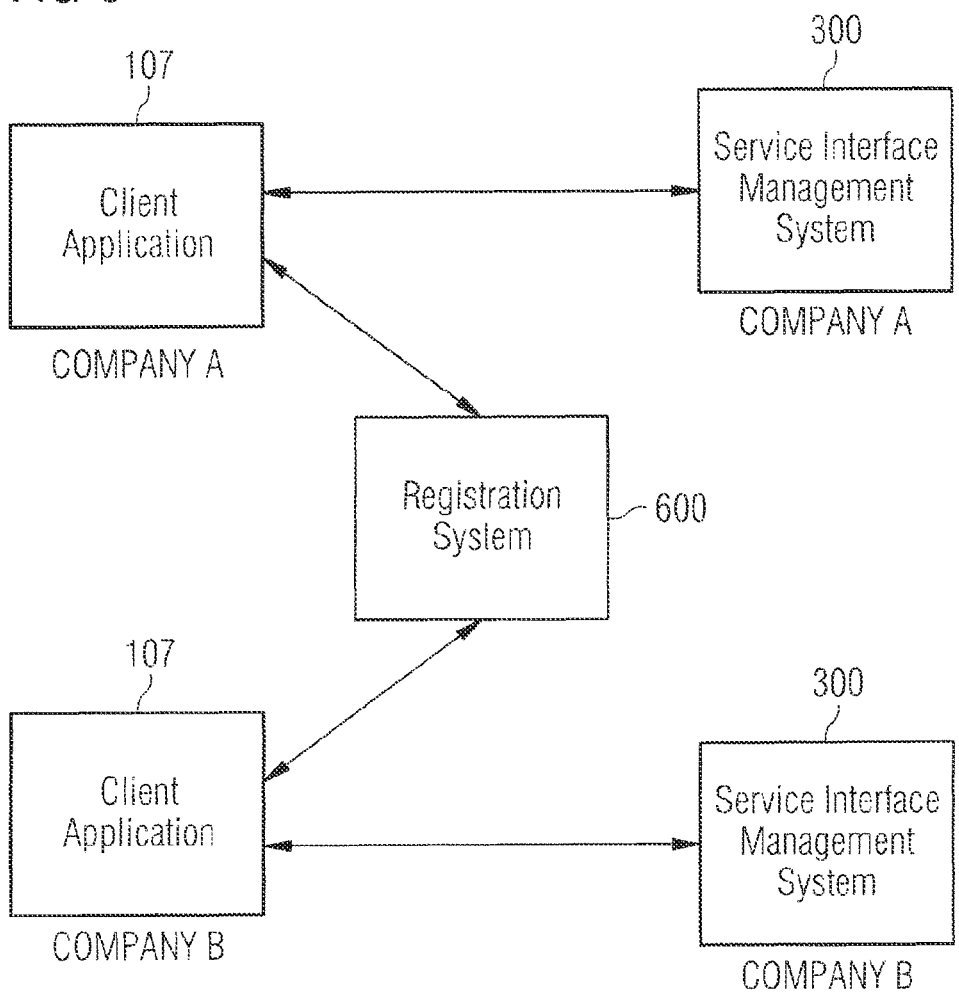

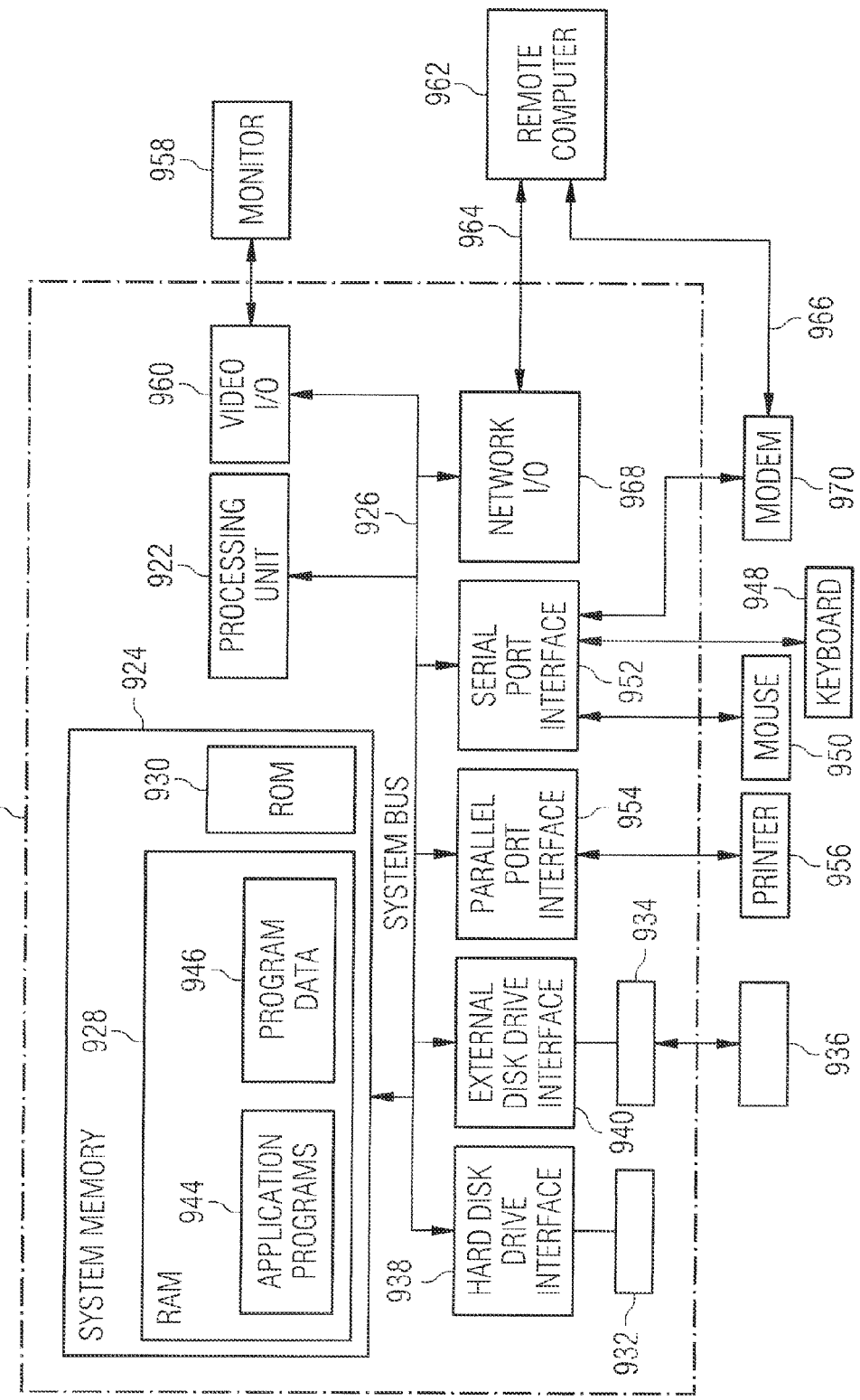

US 8,856,365 B2

COMPUTER-IMPLEMENTED METHOD, COMPUTER SYSTEM AND COMPUTER READABLE MEDIUM

TECHNICAL FIELD

This application relates to a computer-implemented method, a computer system and a computer readable medium.

BACKGROUND

In classic client-server computing, a broadly distributed application may partition tasks, workload and/or application processes between at least two devices. For example, the distributed application may be partitioned between a service requester, known as a client, and a service provider, known as a server. The client may request the services provided by the server over a network. For example, the client may request a computing service or an email service provided by the server over a network such as the Internet.

During an upgrade of a distributed application in a client-server computing environment, application code on a client device, i.e. client software, and/or application code on a server device, i.e. server software, may need to be configured. However, configuring the upgraded client software on the client device may result in many problems. For example, a user of the client device may ignore a notification from the server requiring configuration of the client software and continue to try to use the client software that has not been upgraded. Further, the user of the client device may try to use the upgraded client software without having configured the upgraded client software. Moreover, even if the user of the client device tries to configure the upgraded client software, errors may be introduced during the configuration, causing the upgraded client software to point to non-existent server software.

BRIEF DESCRIPTION OF THE DRAWINGS

Details of one or more implementations are set forth in the accompanying exemplary drawings and exemplary description below. Other features will be apparent from the description and drawings, and from the claims.

FIG. 1 shows an exemplary system architecture diagram, according to an embodiment;

FIGS. 2a-2d illustrate exemplary schematic diagrams, according to an embodiment;

FIG. 3 shows an exemplary service interface management system, according to an embodiment;

FIG. 4 shows an exemplary method, according to an embodiment;

FIG. 5 shows another exemplary method, according to an embodiment;

FIG. 6 shows an exemplary registration service, according to an embodiment; and FIG. 7 shows an exemplary computer system and/or computer network system for implementing a computer system and a method as shown in FIGS. 1 to 5, according to an embodiment.

DETAILED DESCRIPTION

In the following, a detailed description of embodiments will be given with reference to the drawings. It should be understood that various modifications to the embodiments may be made. In particular, one or more elements of one or more embodiments may be isolated from each other and may be combined and/or used in other embodiments to form new embodiments.

FIG. 1 shows an exemplary system architecture diagram 100 of communications between a server 101 and a client device 102 via a network 103, according to an embodiment. The server 101 may be a computing device such as a computer. The client device 102 may be a smartphone, a tablet computer, a personal digital assistant (PDA), a desktop computer, a laptop, etc.

According to an embodiment, the server 101 may host or provide one or more services, such as 104-106. A service may be a computer process, software or application performing specific functions. A service may have one or more versions. For each version of a service, a service interface, also known as a contract, may be provided on the server 101, enabling applications to access to the version of the service. For example, in FIG. 1, service interfaces 104a-n are offered for the available versions of the service 104. Service interfaces may be provided for services 105 and 106 as well. A service interface, enabling an application access to a version of a service, may be accessed via an access indicator. An example of an access indicator may be a Uniform Resource Locator (URL) or other pointer to the access indicator.

The server 101 may be one of a plurality of versions. If a plurality of versions is provided for a single server, such as the server 101, a newer version of the server may offer more service interfaces than an older version of the server. Further, if multiple instances of a specific version of the server are implemented, e.g., each instance of a specific version of the server is implemented in a different business, each service interface corresponding to a specific version of a service residing on an instance of the server is addressable via a different access indicator. For example, an instance of server X is implemented at Company A and another instance of server X is implemented at Company B. To access a service interface residing on server X at Company A, a client application may use an access indicator such as a URL (e.g. http(s)://companya.com/svc). To access a service interface for the same service of the same version residing on server X at Company B, a client application may use a different access indicator such as a different URL (e.g. http(s)://companyb.com/svc).

The client device 102 may include a client application 107. The client application 107 may comprise code and may be pre-installed on the client device 102 or may be downloaded onto the client device 102. The client application 107 may use one or more service interfaces residing on the server 101. For example, the client application 107 may use only service interface 104a and therefore may be considered a static client application. Another approach includes the client application 107 being enabled to use a selection of service interfaces 104a-n such as service interface 104a, service interface 104b and service interface 104c, and therefore may be considered a multi-static client application. In the static and multi-static client applications, the service interfaces may be addressed by an access indicator encoded in code of the client application 107. For example, a client application may use an access indicator such as a URL (e.g. http(s)://companya.com/svc) to address a specific version of a service interface.

An example of pseudo-code for a multi-static client application:

```
# Constants:
# describing the contracts (implementations) the applications was built against
        Contracts = [C1, C2, C3, C4]
# Application Configuration:
# Contract-management-service endpoint; identical for ALL application
        ConfiguredContractManagementURL =
            http://smallexample.com:50009/sap/opu/sdata/iwfnd/CONTRACTMANAGEMENT/
# Locally persisted values: initially null
        PersistedContractURL =
            http://smallexample.com:50009/sap/opu/sdata/iwcnt/WFODCPROCESSING
        PersistedContract = 1
        PersistedContractManagementURL =
            http://smallexample.com:50009/sap/opu/sdata/iwfnd/CONTRACTMANAGEMENT/
# Coding
main( ) {        checkContractURL( )
        ContractURL = PersistedContractURL
        Contract = PersistedContract
        # really launches application:
        Loop until (application is closed) {
        ...some user interaction... based on <Contract> using <ContractURL>
        if (application is idle)
                {# call once per "foreground state" or per "application launch"
                    findBestMatchingContract( ) }
        }
        # end application.
}
checkContractURL( ) {
        if (ConfiguredContractManagementURL is null)
            {# Configuration missing --> exit application (or work offline)
                exit( )       }
        if (ConfiguredContractManagementURL <> PersistedContractManagementURL)
            {# ConfiguredContractManagementURL has changed
            PersistedContractManagementURL = null       }
        if ((PersistedContractURL is null) or
            (PersistedContract is null) or
            (PersistedContractManagementURL is null))
        { findBestMatchingContract( )
            if (PersistedContractURL is null)
            { # We are in serious trouble --> exit application (or work offline)
                exit( )          }
        }
}
findBestMatchingContract( ) {
    callURL = ConfiguredContractManagementURL & "?Contracts=" & Contracts
    try {
        ContractEntity = call_http_GET(callURL) # ContractEntry is the response payload
        PersistedContractURL = ContractEntity.ContractURL
        PersistedContract = ContractEntity.Contract
        PersistedContractManagementURL = ConfiguredContractManagementURL
    } catch { # verification failed --> do nothing}
}
```

End of pseudo-code

Advantageously, the client application may switch to a newer service interface as soon as possible, but avoiding a disruptive switch during application runtime. During application runtime, the client application may detect a newer version of a service interface, but the newer service interface will be used the next time the application is started.

Yet another approach is the client application 107 being enabled to use all service interfaces offered by the server 101, such as service interfaces 104a-n, and therefore be considered a dynamic client application. The one or more specific service interfaces that the client application 107 may use are considered acceptable service interfaces. For example, the dynamic client application may be a browser type/generic client type application.

A dynamic application may include the access identifier of the service interface management system and may pass the input parameter to the service interface management system in a request to the to the service interface management system. Instead of the input parameter being acceptable service interfaces, the input parameter may be an application identifier expressing the purpose of the application such as an employee list or opportunity list. The service interface management system may look up the service interfaces belonging to the application identifier and determine a best matching service interface from these service interfaces.

An example of pseudo-code for a dynamic client application:

```
# Constants:
# describing the purpose of the application (e.g. Employee list, opportunity list) via an application ID
    ApplicationID = 1234
```

```
# Application Configuration:
# Contract-management-service endpoint; identical for ALL application
        ConfiguredContractManagementURL =
            http://smallexample.com:50009/sap/opu/sdata/iwfnd/CONTRACTMANAGEMENT/
# Locally persisted values: initially null
        PersistedContractURL =
            http://smallexample.com:50009/sap/opu/sdata/iwcnt/Employeelookup;v=3
        PersistedContractManagementURL =
            http://smallexample.com:50009/sap/opu/sdata/iwfnd/CONTRACTMANAGEMENT/
# Coding
main( ) {       checkContractURL( )
        ContractURL = PersistedContractURL
        # really launches application:
        Loop until (application is closed) {
        ...some user interaction... using <ContractURL>
        if (application is idle)
              {# call once per "foreground state" or per "application launch"
                  findBestMatchingContract( ) }
        }
        # end application.
}
checkContractURL( ) {
        if (ConfiguredContractManagementURL is null)
            {# Configuration missing --> exit application (or work offline)
                exit( )      }
        if (ConfiguredContractManagementURL <> PersistedContractManagementURL)
            {# ConfiguredContractManagementURL has changed
            PersistedContractManagementURL = null     }
        if ((PersistedContractURL is null) or
               (PersistedContractManagementURL is null))
          { findBestMatchingContract( )
            if (PersistedContractURL is null)
              { # We are in serious trouble --> exit application (or work offline)
                 exit( )     }
          }
}
findBestMatchingContract( ) {
    callURL = ConfiguredContractManagementURL & "?ApplicationID=" & ApplicationID
    try {
        ContractEntity = call_http_GET(callURL) # ContractEntry is the response payload
        PersistedContractURL = ContractEntity.ContractURL
        PersistedContractManagementURL = ConfiguredContractManagementURL
    } catch { # verification failed --> do nothing}
}
```

End of pseudo-code

Further, the dynamic application may include a latest version link which enables the application to upgrade to a newer version of a service interface as soon as it is available on the server. The response payload of requests addressing a specific service interface must contain an access identifier to the latest (newest) version of the service interface to allow generic clients to switch to the latest (newest) version.

Another example of pseudo-code for a dynamic client application:

```
# Application Configuration:
# Contract-service endpoint; specific for an application
        ConfiguredContractURL =
            http://smallexample.com:50009/sap/opu/sdata/
              iwfnd/EmployeeDirectory
# Locally persisted value: initially null
        PersistedContractURL =
            http://smallexample.com:50009/sap/opu/sdata/
              iwfnd/EmployeeDirectory;v=2
# Coding
main( ) {       checkContractURL( )
        ContractURL = PersistedContractURL
        # really launches application:
        Loop until (application is closed) {
            ...some user interaction... using <ContractURL>
        if (ReponsePayload.latest-version.link <>
        PersistedContractURL) {
                PersistedContractURL =
```

```
                ReponsePayload.latest-version.link }
        }
        # end application.
}
checkContractURL( ) {
        if (ConfiguredContractURL is null)
            {# Configuration missing --> exit application
                exit( )      }
        if (PersistedContractURL is null)
            {      PersistedContractURL = ConfiguredContractUrl }
}
```

End of pseudo-code

If a plurality of versions of an application is provided for a single application, the newer versions of the application may be enabled to use more service interfaces than the older versions of the application. In other words, a newer version of an application may have more acceptable service interfaces than an older version of an application. According to an embodiment, a next version of an application may use one more service interface than a direct predecessor version of the application. Further, a specific version of the application can be installed and used by many users, i.e. there may be many instances of a specific version of the application.

During an upgrade of either the server 101 or the client application 107 on the client device 102, a switch from an older version of the server and/or client application to a newer version of the server and/or client application is performed. However, the client application 107, after an upgrade is performed, may not contain the correct access indicator needed to access a service interface residing on the server 101. For example, an upgraded client application downloaded by Company A may need to be configured to access the new service interface on the server of Company A.

EXAMPLE

FIG. 2a illustrates a server S1 offering a service interface C1 listing all employees with first name, last name and phone number. The Employee-Directory application A1 displays all the employees with first name, last name and phone number. Application A1 may use service interface C1. Application A1 may be an application provided in an application store and may be downloaded by separate entities.

Two companies, Company A, example.org, and Company B, smallexample.com, implement separate instances of server S1 and application A1, as described above, and as shown in FIG. 2b. To ensure that Company A and Company B each display the correct employee directory, access indicators must be properly configured. For example, Company A and Company B may both download application A1 from the application store. Company A uses an access indicator, e.g. URL, https://example.org/u, to address and access the service interface C1 of Company A. Company B uses a different access indicator, e.g. URL, https://smallexample.com/v, to address and access the service interface C1 of Company B.

Thus, employees using application A1 of Company A must enter the access indicator, e.g. URL, https://example.org/u, and the employees using application A1 of Company B must enter the access indicator, e.g. URL, http://smallexample.com/v.

In FIG. 2c, when the Employee-Directory application A1 is extended, i.e. upgraded, the next version of the application, e.g. application A2, may have additional functionality, e.g. displaying a photo of an employee in addition to the other employee data. Application A2 may accept both service interface C1 and service interface C2, while application A1 still only accepts service interface C1. Further, both Company A and Company B may still use server S1.

Once application A2 is distributed via the application store, application A2 is indicated as the new version of application A1 in an update announcement to application A1 users in both Company A and Company B. For example, an email announcement may be sent to employees of Company A and Company B that use application A1, stating there is a new version of application A1.

Accordingly, some employees may update the application A1 to application A2, the remaining employees may not update the application A1 to application A2 and instead still use application A1. Application A1 will still work, since application A1 accepts service interface C1 and server S1 offers service interface C1. Application A2 will work since application A2 can still accept service interface C1 in addition to service interface C2 and server S1 offers service interface C1, as shown in FIG. 2c.

FIG. 2d illustrates a scenario in which Company A switches to server version S2 offering service interface C1 and service interface C2. When the server S2 is upgraded, the next server version S2 may offer a service interface C2 listing all employees with a first name, last name, phone number and photo, in addition to service interface C1. Service interface C1 is still offered because it is a stable service interface and cannot be changed or deleted. Application A1 will still accept service interface C1 offered by the server S2. Application A2 will accept service interface C2 now offered by server S2, and service interface C1 still offered by server S2.

However, the access indicators in application A1 and application A2 must point to the appropriate service interface in order to access the correct version and service offered by the server. Thus, to configure an upgraded client application on a client device, a service interface management system is provided, according to an embodiment.

FIG. 3 illustrates an exemplary service interface management system 300. According to an embodiment, a service interface management system 300 is provided to reduce configuration efforts when upgrading an application or a server. The service interface management system 300 may include request receipt module 310, match determination module 320 and access indicator module 330. The match determination module 320 may further comprise acceptable service interface module 340 and best matching service interface module 350.

The service interface management system 300 may be implemented as hardware, as a software platform or as a cloud. For example, the service interface management system 300 may comprise an example of cloud computing. Cloud computing provides computation, software, data access, storage resources, etc. without requiring cloud users, i.e. the client devices, to know the location and other details of the computing infrastructure. Thus, the cloud may comprise delivery of computing as a service where shared resources, software, and information are provided to computers and other devices as a service over a network. Access to cloud-based applications may be through a client device, such as a web browser or portal or a light weight desktop or a mobile application.

On the client application side, instead of encoding an access indicator of a service interface into the client application, the client application may include an access indicator of the service interface management system 300. For example, Company A will encode into the client application an access indicator for service interface management system of Company A, and Company B will encode into the client application a different access indicator for service interface management system of Company B. Thus, when a request is made by a client application, the request is automatically sent to the service interface management system 300 using the access indicator, such as a URL of the service interface management system 300. In response to the request from the client device, the service interface management system 300 may provide the client device with an access indicator. The service interface management system 300 may provide access indicators for each type of application in a business and for all versions of one application type for a business.

The request receipt module 310 may receive a request from a client application residing on a client device, indicated by an access indicator. The request may include an input parameter, from the client application which may be encoded with the input parameter. The input parameter may represent one or more service interfaces acceptable to the client application.

The match determination module 320 may determine a matched service interface. As discussed above, the match determination module 320 may further comprise the acceptable service interface module 340 and the best matching service interface module 350. To determine a matched service interface, the acceptable service interface module 340 may determine a value of the input parameter from the request received from the client application by the request receipt module 310. The input parameter may represent one or more service interfaces acceptable to the client application. For example, referring to FIG. 1, the client application 107 may only access service 104 via service interfaces 104a and 104b. Thus, service interfaces 104a and 104b are acceptable service interfaces.

The acceptable service interface module 340 may also retrieve service interfaces offered by the server from data storage. The data storage may be coupled to the server or may be coupled to the service interface management system 300. For example, referring to FIG. 1, the service interfaces offered by the server 101 may be the service interfaces 104a-n.

The acceptable service interface module 340 may then determine whether any of the one or more acceptable service interfaces match any of the service interfaces offered by the server. If more than one matched service interface is determined by the acceptable service interface module 340, the best matched service interface module 350 may determine the best matching service interface from among the matched service interfaces. The best matching service interface may be the matched service interface of the newest version based on a predetermined order of application versions. Alternatively, the best matching service interface may be the matched service interface of the most relevance. In addition, if no match is determined, the service interface management system 300 sends an error message to the client application on the client device, indicating the application will not function.

Once a matched service interface is determined, the access indicator module 330 may determine an access indicator of the matched service interface. The access indicator of the matched service interface may be a Uniform Resource Locator (URL) of the matched service interface. For example, a URL for the service interface may be determined from a lookup table storing service interfaces and their corresponding access indicators, e.g. URLs. The access indicator module 330 may then send the access indicator, e.g. URL, of the matched service interface to the client application residing on the client device. The client device may use the access indicator to connect to the server via the appropriate service interface.

Summarizing, a service interface management system for processing a request to connect to a server from an application residing on a client device may be provided, comprising:
 a request received module configured to receive the request to connect to the server from the application residing on the client device;
 a match determination module configured to determine a matched service interface; and
 an access indicator module configured to determine an access indicator of the matched service interface and to send an access indicator of the matched service interface to the application residing on the client device in response to the request to connect to the server. The match determination module may further comprise:
 an acceptable service interface module configured to:
 determine an input parameter from said request, said input parameter representing one or more service interfaces acceptable to the application; and
 determine whether any of the one or more acceptable service interfaces match service interfaces offered by the server; and
 a best matching service interface module configured to determine a best matching service interface if more than one matched service interface is determined.

Advantageously, all applications need is knowledge of one access indicator, i.e. the URL of the service interface management system 300. By accessing the access indicator, no other configuration information is necessary because the service interface management system 300 provides the configuration, i.e. the URL, to the client application. The access indicator of the service interface is the service interface the client application should connect to such that it can be connected to the server. Even if the client application itself is upgraded, the URL of the service interface management system 300 may be hardcoded into the client application code. Thus, the upgraded client application will still point to the service interface management system 300. Further, the client application will automatically switch to the best version of the service interface with respect to those offered by the server.

The above-described computer system may be operable to carry out the methods as described below in conjunction with FIG. 4 and FIG. 5.

FIG. 4 shows an exemplary method 400, according to an embodiment. The method 400 illustrates the steps involved in responding to a request from an application residing on a client device to connect to a server, according to an embodiment.

At step 410, a service interface management system receives a request to connect to a server from an application residing on a client device. The request may be directly from the application residing on the client device or may be routed through another service, such as a registration service. In other words, the receiving, at a service interface management system, the request to connect to the server from the application residing on the client device may further comprise determining an access identifier of the service interface management system from a registration service At step 420, the service interface management system determines a matched service interface. This step is described in more detail below with reference to FIG. 5.

At step 430, the service interface management system determines an access indicator of the matched service interface. The access indicator of a matched service interface may be a Uniform Resource Locator (URL) of the matched service interface.

At step 440, the service interface management system sends the access indicator of the matched service interface to the client application residing on the client device in response to the request to connect to the server.

FIG. 5 shows an exemplary method 500 of describing step 420 of the method 400 of FIG. 4, according to an embodiment. The method 500 illustrates the steps involved in determining a matched service interface, according to an embodiment.

At step 510, the service interface management system determines an input parameter from said request. The input parameter represents one or more service interfaces acceptable to the application.

At step 520, the service interface management system determines whether any of the one or more acceptable service interfaces matches any service interfaces offered by the server, i.e. one or more matched service interfaces is determined. If more than one matched service interface is determined at step 520, the method proceeds to step 530. If only one matched service interface is determined, the method 500 ends and returns to step 430 of the method 400.

At step 530, the service interface management system determines a best matching service interface from the more than one matched service interface. The best matching service interface may be the matched service interface of the newest version based on a predetermined order of application versions. Alternatively, the best matching service interface may be the matched service interface of the most relevance.

After determining the best matching service interface, the method 500 ends and returns to step 430 of the method 400, wherein the best matching service interface is the matched service interface.

In view of the above described methods, a computer readable medium may be provided. The computer readable medium may be operable for processing a request from a client device to connect to a server. The computer readable medium may comprise computer executable instructions that, when executed, perform the steps of:
- receiving the request to connect to the server from the application residing on the client device;
- determining a matched service interface;
- determining an access indicator of the matched service interface; and
- sending the access indicator of the matched service interface to the application residing on the client device in response to the request to connect to the server.

Further, a client side application may be provided. The client side application may reside on a client device for connecting to a server, said client application configured to:
- send, to a service interface management system, the request to connect to the server;
- receive, from the service interface management system, an access indicator of a matched service interface in response to the request to connect to the server; and
- connect to the server based on the received access indicator.

Moreover, a server may be provided. The server may process a request to connect to a service interface from an application residing on a client device, comprising:
- a plurality of service interfaces enabling access to services residing on the computer, wherein each service interface is addressable by the application residing on the client device using an access identifier.

Cloud-Based Registration Service

FIG. 6 illustrates a registration service 600 to be used in conjunction with the service interface management system as described above in FIG. 3. According to an embodiment, the registration service 600 may comprise hardware, software or cloud-based services. The registration service 600 enables companies to register their company-specific access indicators of their company-specific service interface management systems. For example, Company A may register an access indicator of their service interface management system 300 with the registration service 600. Similarly, Company B may register an access indicator of their service interface management system 300 with the same registration service 600. Once registered, the client applications 107 of both Company A and Company B may be hard-coded with an access indicator, i.e. URL, of the registration service 600.

The registration service 600 may provide the appropriate access indicator to a requesting company. For example, if Company A requests an access indicator from the registration service 600, Company A will receive the access indicator for their own service interface management system 300. If Company B requests an access indicator from the registration service 600, Company B will receive the access indicator for their own service interface management system 300.

Therefore, on the client-side, instead of maintaining the access indicator of their own service interface management systems 300 in the client application 107, a company may simply maintain the access indicator of the registration service 600 in the client application 107. Advantageously, the access indicator of the registration service 600 is identical for all client applications 107 and can be hard-coded into the client applications 107.

Further, in response to registering with the registration service 600, the registration service 600 may provide Company A with a startup code that is easy to type and remember. The registration service 600 may also provide Company B with a startup code different than that startup code provided to Company A in response to Company B registering with the registration service 600. When employees of Company A and Company B may download their client applications 107, they simply enter the startup code for their respective company into the client application 107 where configuration information is usually entered.

When the client application 107 is started by an employee of Company A, a request is sent to the registration service 600 to read the access indicator, e.g. URL, of the service interface management system 300 of Company A. Similarly, when the client application 107 is started by an employee of Company B, a request is sent to the registration service 600 to read the access indicator, e.g. URL, of the service interface management system 300 of Company B. Thus, the registration service 600 returns an appropriate access indicator to a requesting company in exchange for the startup code. Alternatively, if the client application is bound to a specific device with a unique identifier, e.g. a mobile device with an IMEI number, a company can register multiple devices with the unique identifiers with the registration service 600. For example, an application programming interface (API) may read the IMEI number of the device, and provide the IMEI number to the registration service 600. The registration service 600 may register the IMEI number of each device belonging to a group with a specific access identifier, such as a URL of the service interface management system 300 of the company. Therefore, all of the devices belonging to a group or company may be registered with the registration service 600. When the client application is started on a registered device, the IMEI number is automatically provided to the registration service 600, and the registration service may respond with the access identifier associated with that IMEI number. Advantageously, the client applications can then use the unique identifier such as the IMEI number instead of the startup code to request the access identifier of the service interface management system 300 from the registration service 600.

FIG. 7 shows an exemplary system for implementing the method including a general purpose computing device in the form of a conventional computing environment 920 (e.g. a server). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the server 920, such as during start-up, may be stored in the ROM 930. The system bus 926 may be any of several types of bus structures including a memory bus or memory controller, a peripheral bus, and a local bus using any of a variety of bus architectures.

The server 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the server 920. The data structures may include relevant data for the implementation of the method, as described above. The relevant data may be organized in a database, for example a relational database management system or a object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 3.

A user may enter commands and information, as discussed below, into the server 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 2 depicts the computer environment networked with remote computer 962, i.e. mobile device 102. The remote computer 962 may be another computing environment such as a mobile device such as a smart phone or tablet, and may include many of the elements described above relative to the computing environment 920. The logical connections depicted in FIG. 8 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method may be resident on or accessible via the remote computer 962. It will be appreciated that the network connections shown are exemplary and other means of establishing a communications link between the electronic devices may be used.

The above-described computing system is only one example of the type of computing system that may be used to in the method described above.

What is claimed is:

1. A computer-implemented method for processing a request to connect to a server from an application residing on a client device, comprising:
   receiving, at a service interface management system, the request to connect to the server from the application residing on the client device;
   determining, at the service interface management system, a matched service interface, wherein determining a matched service interface comprises:
      determining an input parameter from said request, said input parameter representing one or more service interfaces acceptable to the application; and
      determining whether any of the one or more acceptable service interfaces match service interfaces offered by the server;
   determining, at the service interface management system, an access indicator of the matched service interface, wherein the access indicator is a uniform resource locator or is referred to via a pointer; and
   sending, from the service interface management system, the access indicator of the matched service interface to the application residing on the client device in response to the request to connect to the server.

2. The method of claim 1, wherein if more than one matched service interface is determined, determining a best matching service interface.

3. The method of claim 2, wherein the best matching service interface is the matched service interface of the newest version.

4. The method of claim 1, wherein the receiving, at a service interface management system, the request to connect to the server from the application residing on the client device further comprises determining an access identifier of the service interface management system from a registration service.

5. A service interface management system for processing a request to connect to a server from an application residing on a client device, comprising:
   a request received module configured, when executed by at least one processor, to receive the request to connect to the server from the application residing on the client device;
   a match determination module configured, when executed by at least one processor, to determine a matched service interface, wherein the match determination module further comprises:
      an acceptable service interface module configured, when executed by at least one processor, to:
         determine an input parameter from said request, said input parameter representing one or more service interfaces acceptable to the application; and
         determine whether any of the one or more acceptable service interfaces match service interfaces offered by the server; and an access indicator module configured, when executed by at least one processor, to determine an access indicator of the matched service interface and to send the access indicator of the matched service interface to the application residing on the client device in response to the request to connect to the server, wherein the access indicator is a uniform resource locator or is referred to via a pointer.

6. The service interface management system of claim 5, wherein the match determination module further comprises a best matching service interface module configured to determine a best matching service interface if more than one matched service interface is determined.

7. The service interface management system of claim 6, wherein the best matching service interface is the matched service interface of the newest version.

8. A non-transitory computer readable medium for processing a request to connect to a server from an application residing on a client device, comprising computer executable instructions that, when executed, perform the steps of:
receiving, at a service interface management system, the request to connect to the server from the application residing on the client device;
determining a matched service interface, wherein determining a matched service interface comprises:
determining an input parameter from said request, said input parameter representing one or more service interfaces acceptable to the application; and
determining whether any of the one or more acceptable service interfaces match service interfaces offered by the server;
determining an access indicator of the matched service interface, wherein the access indicator is a uniform resource locator or is referred to via a pointer; and
sending the access indicator of the matched service interface to the application residing on the client device in response to the request to connect to the server.

9. The computer readable medium of claim 8, wherein if more than one matched service interface is determined, determining a best matching service interface.

10. The computer readable medium of claim 9, wherein the best matching service interface is the matched service interface of the newest version.

\* \* \* \* \*